United States Patent
Ben-Arie

(10) Patent No.: US 11,281,998 B2
(45) Date of Patent: Mar. 22, 2022

(54) SYSTEMS AND METHODS FOR AUTOMATIC LABELING OF CLUSTERS CREATED BY UNSUPERVISED MACHINE LEARNING METHODS

(71) Applicant: PAYPAL, INC., San Jose, CA (US)

(72) Inventor: Aviv Ben-Arie, Tel-Aviv (IL)

(73) Assignee: PayPal, Inc., San Jose, CA (US)

( * ) Notice: Subject to any disclaimer, the term of this patent is extended or adjusted under 35 U.S.C. 154(b) by 625 days.

(21) Appl. No.: 16/215,885

(22) Filed: Dec. 11, 2018

(65) Prior Publication Data
US 2020/0184370 A1  Jun. 11, 2020

(51) Int. Cl.
*G06N 20/00* (2019.01)
*G06K 9/62* (2006.01)

(52) U.S. Cl.
CPC .......... *G06N 20/00* (2019.01); *G06K 9/6218* (2013.01)

(58) Field of Classification Search
CPC ..... G06K 9/6218; G06K 9/6221; G06N 20/00
See application file for complete search history.

(56) References Cited

U.S. PATENT DOCUMENTS

| | | | | |
|---|---|---|---|---|
| 8,438,163 | B1 * | 5/2013 | Li | G06K 9/00536 707/737 |
| 2016/0019132 | A1 | 1/2016 | Vilakkumadathil | |
| 2017/0132307 | A1 | 5/2017 | Xiao et al. | |

OTHER PUBLICATIONS

Kusumaningrum, R. and Farikhin, "An Automatic Labeling of K-means Clusters based on Chi-Square Value"; IOP Conf. Series: Journal of Physics: Conf. Series 801 (2017) 012071; 7 pages.

* cited by examiner

*Primary Examiner* — Robert G Bachner
(74) *Attorney, Agent, or Firm* — Haynes and Boone, LLP

(57) ABSTRACT

Aspects of the present disclosure involve systems, methods, devices, and the like for auto-labeling clusters generated by machine learning models. In one embodiment, a system is introduced that can perform a series of operations for determining comprehensive labels for clusters output from machine learning methods used to classify data sets. The auto-labeling system may include generating labels determined using a computation of a frequency count, ratio, and coverage. These computations may use feature-based dictionaries which aid in the determination, storage, and analysis of the relevant features useful in labeling the clusters.

20 Claims, 7 Drawing Sheets

| CLUSTER ID | FEATURE NAME | FEATURE VALUE | FREQ. RATIO | COVERAGE IN CLUSTER |
|---|---|---|---|---|
| 1 | rcvr_id | Seller | 14062.5 | 14.06% |
| 1 | sub_flow | Send money | 698.31 | 98.44% |
| 1 | IP | Seller IP | 698.31 | 98.44% |
| 3 | seller risk | Seller risk | 23.51 | 100.00% |
| 6 | sub_flow | Express checkout | 419.18 | 14.47% |
| 7 | rcvr_cntry | Country of sender | 10.19 | 100.00% |

FIG. 4

SYSTEMS AND METHODS FOR AUTOMATIC LABELING OF CLUSTERS CREATED BY UNSUPERVISED MACHINE LEARNING METHODS

TECHNICAL FIELD

The present disclosure generally relates to communication devices for data classification using machine learning, and more specifically, to communication devices can automatically label classified data.

BACKGROUND

In the advent of technology, users have moved to the use of electronic devices as a source of communication in everyday life. In some instances, such use often includes the interaction and access of internet websites for news, social content, purchases, and the like. In other instances, the communications can include email access, payment processing, chats, account access, and the like. Oftentimes, merchants and service providers use this information to tailor, market, profile, and access a user. To understand the vast amount of data, machine learning methods are utilized for processing, learning, and predicting. A popular machine learning method often used is clustering. Clustering is a machine learning technique used to group data or sets of objects that are similar. The objective of clustering is to classify the information into groups (e.g., clusters) such that the data within the group is more similar to each other than to data in other groups. A difficulty often encountered with clustering however, is the lack of descriptions or labels associated with the groups identified. The lack of such descriptor may lead to errors, wasted time, and inaccuracies. Therefore, to accurately interpret the classified data received and/or retrieved, it would be beneficial to create a system that can label classified information in a fast and efficient way.

BRIEF DESCRIPTION OF THE FIGURES

FIG. 4 illustrates the implementation of frequency feature dictionaries for use in automatic labeling of clusters created by unsupervised machine learning methods.

Figure 1:
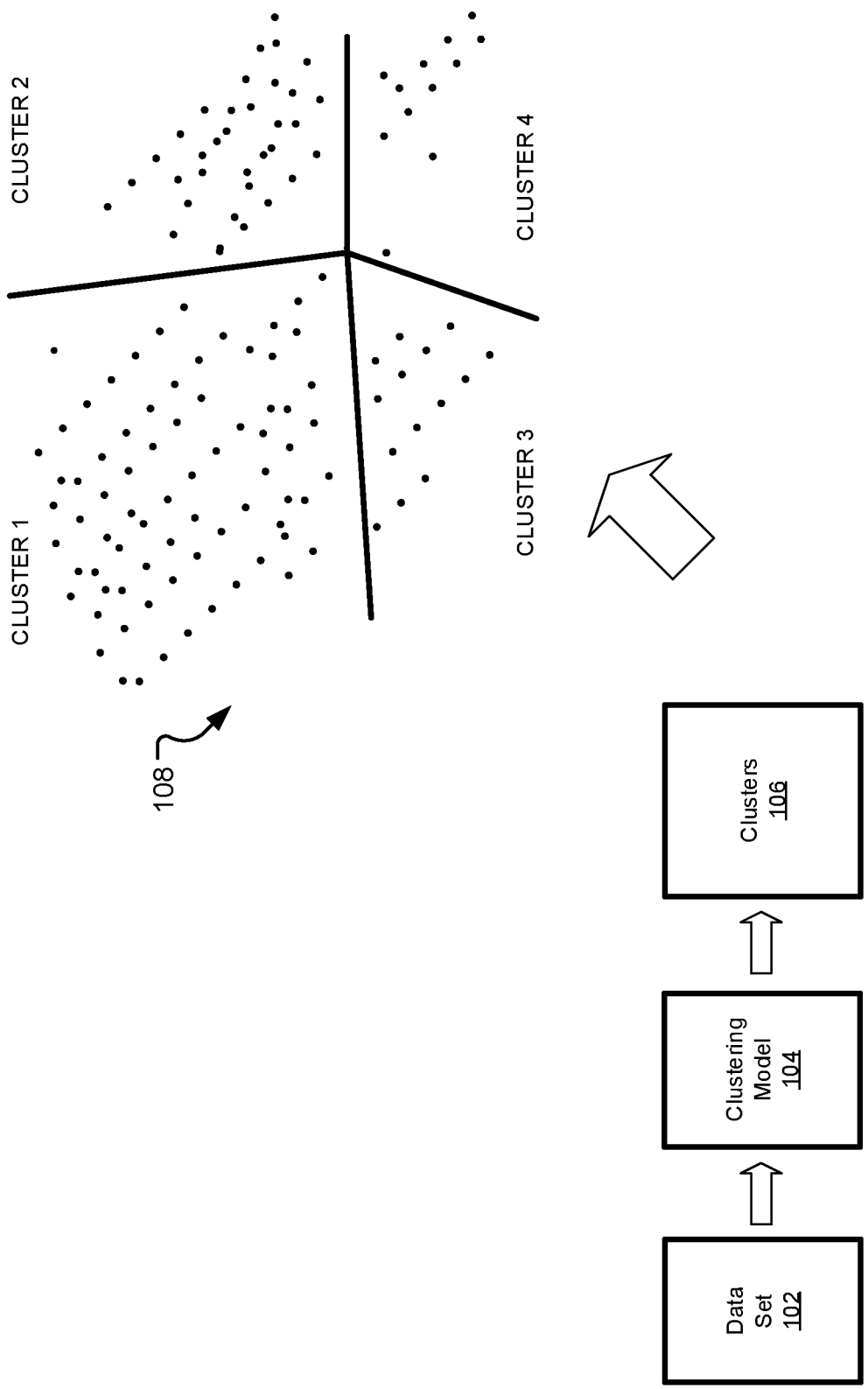
FIG. 1 illustrates an exemplary block diagram of a system for classifying information.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for auto-labeling clusters generated by machine learning models. In one embodiment, a system is introduced that can perform a series of operations for determining comprehensive labels for clusters output from machine learning methods used to classify data sets. The auto-labeling system may include generating labels determined using a computation of a frequency count, ratio, and coverage. These computations may use feature-based dictionaries which aid in the determination, storage, and analysis of the relevant features useful in labeling the clusters.

Currently, users have moved to the use of electronic devices as a source of communication in everyday life. In some instances, such use often includes the interaction and access of internet websites for news, social content, purchases, and the like. In other instances, the communications can include email access, payment processing, chats, account access, and the like. Oftentimes, merchants, service providers, and other entities may benefit from such information to tailor, market, profile, and access a user. With the vast amount of data and wide use of electronics, machine learning methods are being used to classify, learn, and predict from such data received.

For example, consider FIG. 1, which illustrates an exemplary use of a machine learning technique. Machine learning techniques can include supervised and unsupervised learning. Supervised learning techniques include those techniques which include a data set whose output is known. That is to say, a relationship is known and can be used in making predictions using the relationships identified. Generally, an unsupervised machine learning technique on the other hand approaches a solution little or no prior knowledge on what the results should look like. Therefore, a structure is derived from the data. A popular unsupervised machine learning method often used is clustering. Clustering is a machine learning technique used to group data or sets of objects that are similar. The objective of clustering is to classify the information into groups (e.g., clusters) such that the data within the group is more similar to each other than to data in other groups.

Various methods for determining clusters exist. For example, clustering method may include a connectivity model where grouping (e.g., clustering) occurs based on the similarity between the data points. For example, it may be determined that those data points (e.g., observations) which exhibit more similarity to each other are closer and thus clustered. As another example, the data points may be placed in a single cluster and then portioned as the distance between them increases.

Another clustering method can include a centroid method. This is an iterative approach used to determine a closeness of a data point to a centroid of a cluster. Other methods used include the use of distributions (e.g., points fall within a Gaussian distribution) for clustering. While other clustering methods can include the use a density model where the population or density of data points found in a region designate the cluster.

Therefore, in turning to FIG. 1, the data set or observations 102 received are input into a machine learning model. In one embodiment, the model is an unsupervised learning model and does not necessitate inputs and outputs for learning as was the case with the supervised learning. The model may include a clustering model 104 which may use one or more of the methods described above for grouping or clustering the data set 102 that is input.

Next, as the data set 102 is processed, the clustering model 104 analyzes and determines how best to cluster the data set 102 that is input. Thus, output from the clustering model 104 are clusters 106. As illustrated the data set 102 may output as a number of clusters distinguished based on the clustering method used. To illustrate, consider clusters 108, wherein the data set 102 in its entirety was grouped in this example into four clusters.

A difficulty often encountered with clustering, is the lack of descriptions or labels associated with the groups identified. Therefore, although the data set 102 is now grouped, a label or descriptor indicating how the data set is similar and what the group represents is lacking. The lack of such descriptor may lead to errors, wasted time, and inaccuracies. For example, consider a group within an organization working on fraud detection. Output from the clustering model 104 are clusters, however what the clusters mean and how to tag the now clustered data may be difficult and costly. Additionally, fraud trends may vary over time, thus if the clustering model 102 clustered the data set 102 such that each cluster represents a fraud trend, large monetary costs may arise as a cluster trend is identified incorrectly. Therefore, to accurately interpret the classified data received and/or retrieved, it would be beneficial to create a system that can label classified information in a fast and efficient way.

Figure 2:
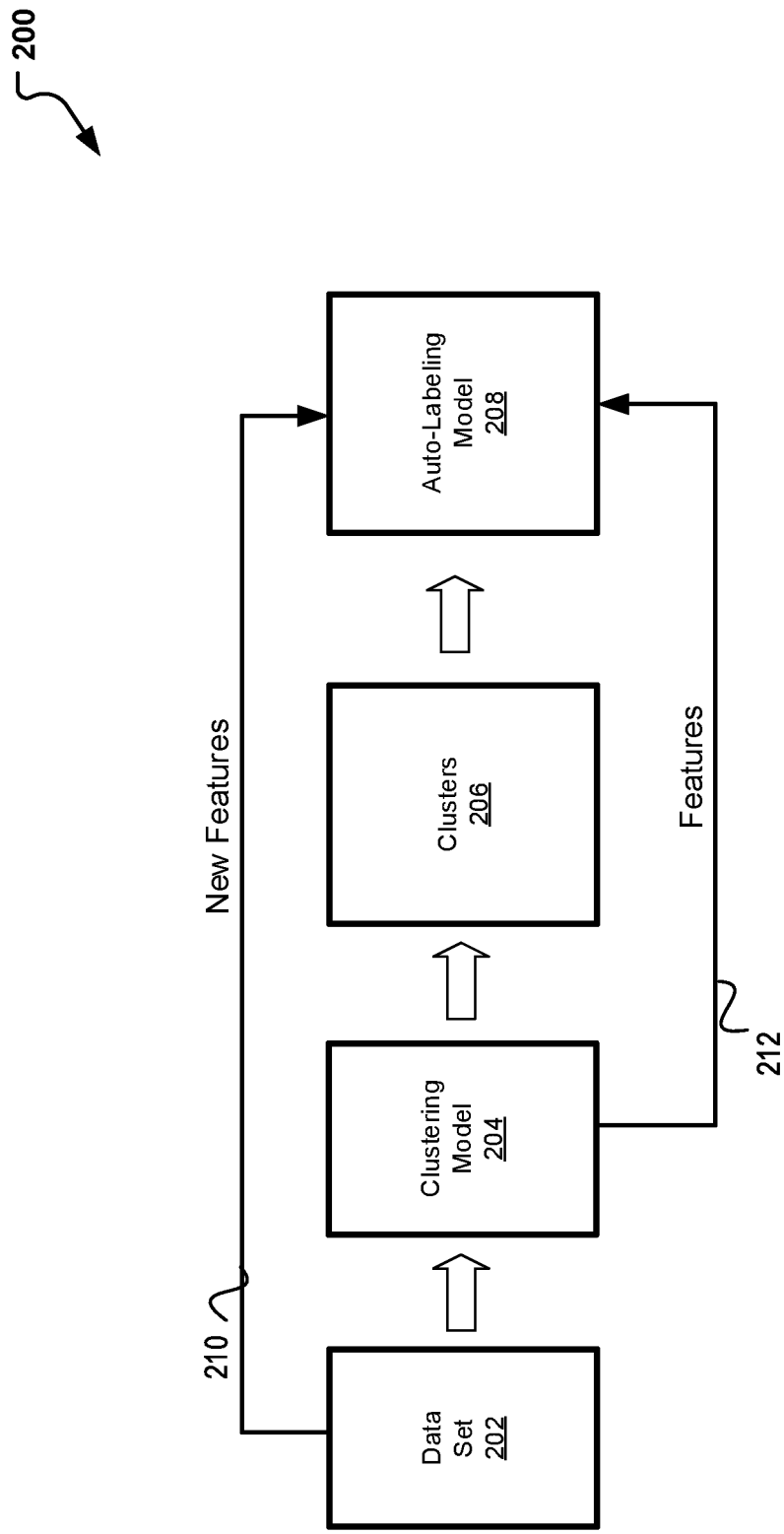
FIG. 2 illustrates an exemplary block diagram of a system for classifying and automatically labeling information.

In one embodiment, an automatic labeling technique is introduced in FIG. 2. As previously indicated, a difficulty is encountered in the output clusters 106 received from the clustering model 104. Thus, as would be expected, the labeling enhancement is introduced after the data set 202 has been clustered 206. Therefore, again a system is introduced which can receive and/or retrieve a data set input which may include user, seller, merchant, service provider, and like information that may be used in making assessments about a user, entity, event, etc. The data set can be input into an unsupervised machine learning—clustering model 204, which is designed to group the data sets into clusters. The clusters 206 may therefore correspond to grouping of the data set 202 based on one or more similarities. For example, the clusters 206 may represent fraudulent trends and as such each cluster represents a distinct trend. Because the clustering model 204 generally does not provide labeled clusters, auto-labeling model 208 is introduced. The auto-labeling model 208 may be a model design to run an algorithm capable of adding labels to clusters 206 output from the clustering model 204. Now because the clustering model 204 has been used on the current data set 202, the features 210 used by the clustering model 204 may be reused in the labeling process. Additionally, new or missed features 212 may be introduced to the auto-labeling model which may help further in labeling. The new or missed features 212 may derive from new features identified and/or if the data was noisy.

Figure 3:
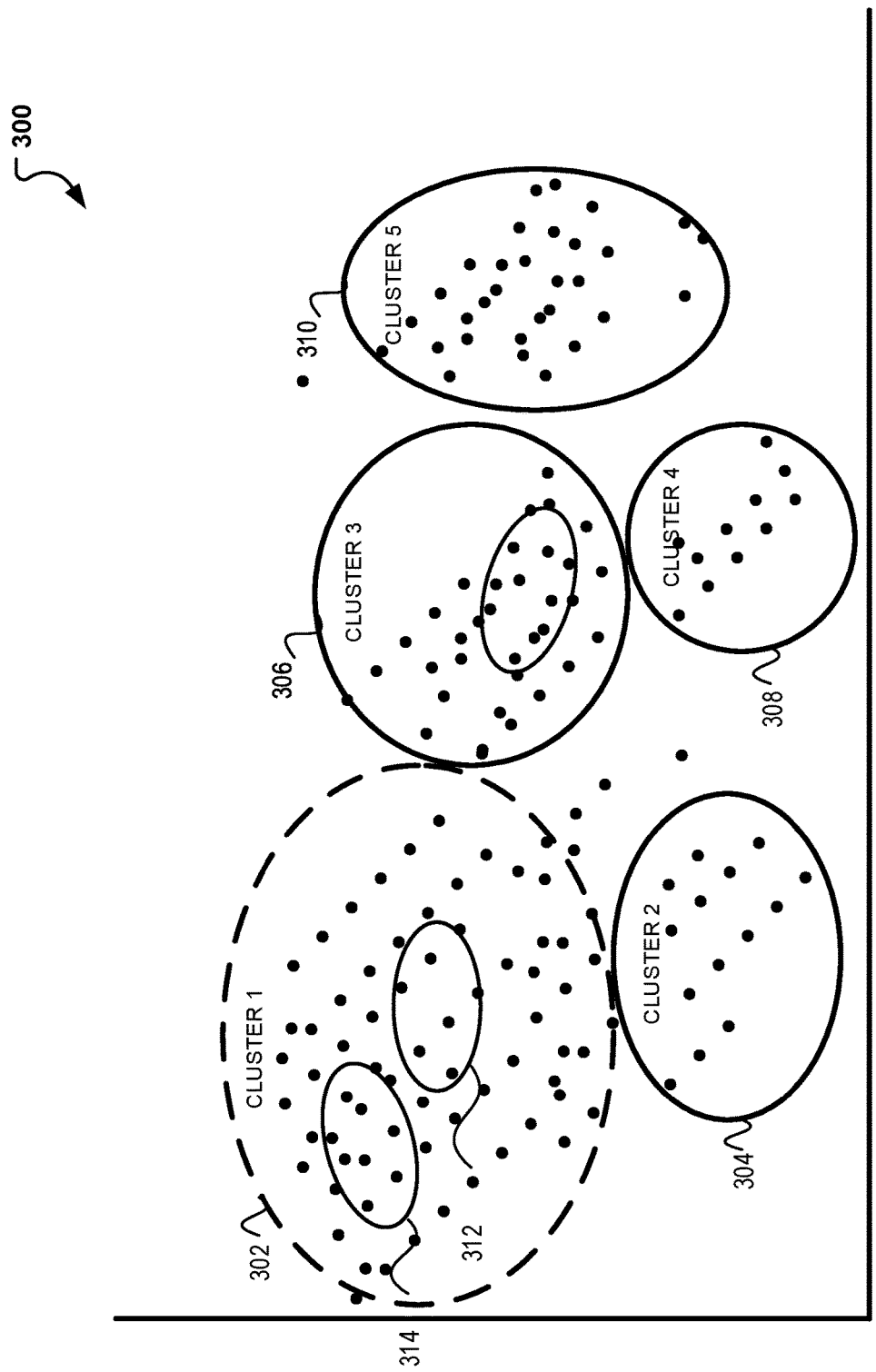
FIG. 3 illustrates a diagram of the classification of information using unsupervised machine learning methods for automatic labeling.

In the implementation of the auto-labeling model 208 and upon receipt of the currently used and new features to the system, dictionaries are created for use in labeling. In one embodiment, various dictionaries may be created. Therefore, in turning to FIG. 3, exemplary output clusters are presented from which the dictionaries may be created. First, a dictionary may be created for each cluster output 302-310. Next, a dictionary for the features 312-314 in the cluster may also be created. As such, a dictionary may be created for each cluster (e.g., a dictionary is determined for cluster 302) and additionally a dictionary may be created for each feature in the cluster (e.g., assuming 314 represents a feature, a dictionary is created for the feature 314).

The dictionaries can include descriptors, the features, ratios, and other metrics. In one embodiment, the dictionaries include frequency counts for each feature in the cluster. That is to say, for each feature within each cluster, a count of the frequency of the feature is determined. This feature frequency count documented in the dictionaries is used in determining the labels to maintain and use to describe the clusters 302-308 identified and output by the clustering model.

Thus, with the frequency counts now computed for each feature in each cluster, a ratio of the features may be determined.

$$\text{ratio}_{C_k} = \frac{\text{frequency value within } C_k}{\text{frequency value within } \Sigma\ C_x}$$

where the ratio is taken of the frequency count determined for the current cluster k over the sum of the frequency count over the sum of all other clusters. That is to say, the sum of the frequency count for the dictionary computed in the current cluster ($\Sigma k$) is split and counted and separately, and then the same is computed for the sum frequencies for the values from the k−1 frequency dictionaries. Once the values are computed, then the frequencies are transformed to a ratio such that the ratio $\in [0,1]$. Next, in addition to computing the frequency ratios, coverage within a cluster is also computed. In one embodiment, computing the coverage can include determining how many samples within a cluster does the specific value cover. Once the ratios and coverage are determined, then those relevant features that meet a criteria may be kept and used in labeling the clusters identified.

FIG. 4 for example, illustrates the implementation of frequency feature dictionaries for use in automatic labeling of clusters created by unsupervised machine learning methods. In particular, FIG. 4 illustrates an exemplary output which may be used for labeling the clusters. As exemplified, a table 400 output has been generated with descriptions of the clusters and features associated with the cluster. In addition, the frequency ratio and coverage previously computed are included. Also introduced is the feature value in this table 400. The feature value can be a label that now used to describe a feature associated with the cluster which can aid in understanding the data set grouping computed by the clustering model. For example, consider cluster 1 of table 400. As identified, three significant features exist in this cluster including but not limited to a seller, a technology type (e.g., Send Money from PayPal) and a seller IP address. Therefore, in cluster 1, the cluster the send money technology is a large feature in the cluster with the seller taken into consideration. Similarly, clusters 3, 6, and 7 are included with relevant features identified, ratios, coverage and feature labels included. Thus, with this table output a user may obtain a more comprehensive view of the features and details covered within a cluster. Additionally, a better understanding may be obtained in understanding how the data set is grouped based on the features that make up each of the clusters as defined by the table output 400.

Figure 5:
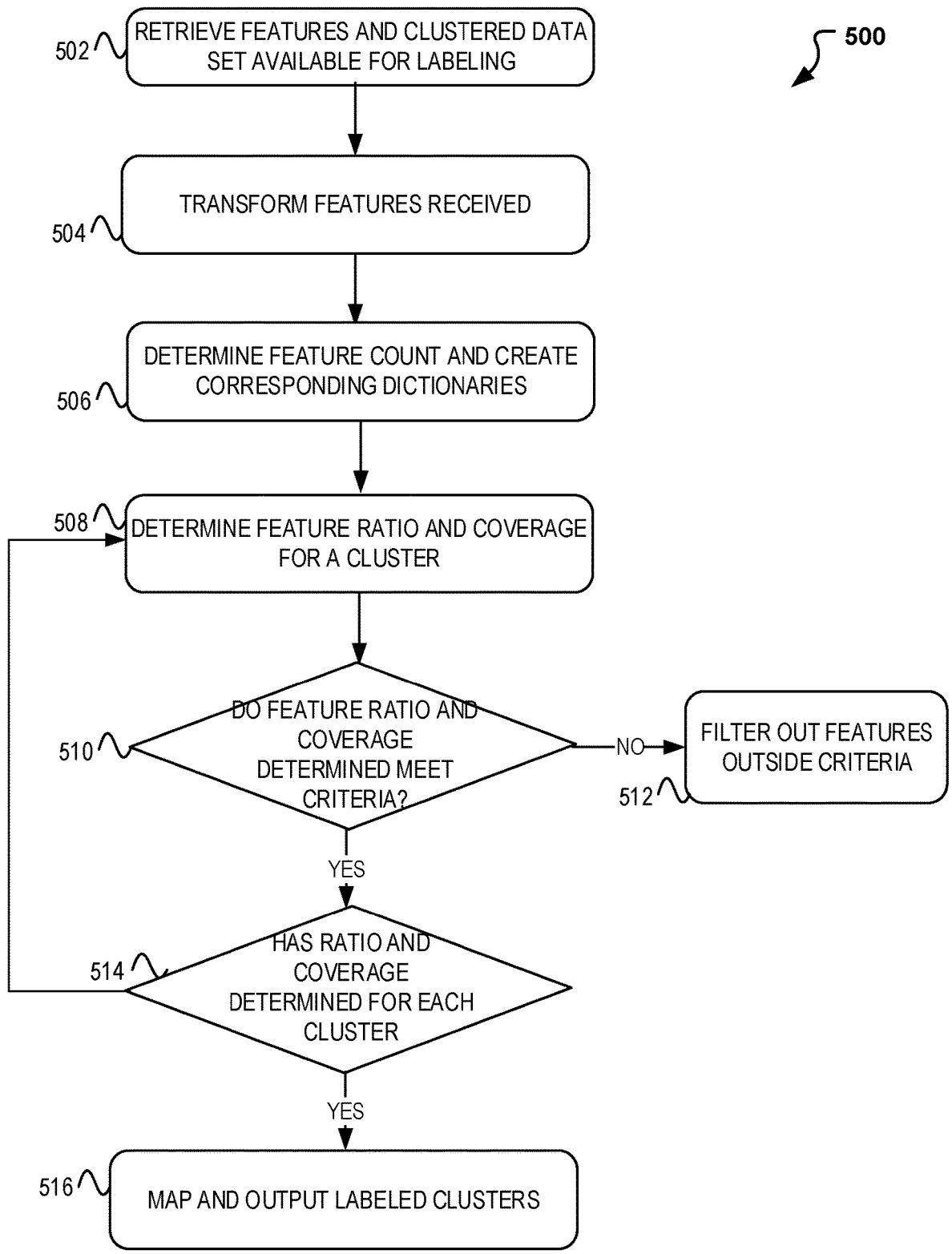
FIG. 5 illustrates a flow diagram illustrating operations for the implementation of an automatic labeling method for clusters created by unsupervised machine learning methods.

Next at FIG. 5, an example process 500 for the implementation of cluster labeling as implemented by a system and method such as that presented above and in conjunction with FIG. 2 presented. In particular, FIG. 5 illustrates a flow diagram illustrating operations for labeling clusters created by unsupervised machine labeling methods. According to some embodiments, process 500 may include one or more of operations 502-516, which may be implemented, at least in part, in the form of executable code stored on a non-transitory, tangible, machine readable media that, when run on one or more hardware processors, may cause a system to perform one or more of the operations 502-516.

Process 500 may begin with operation 502, where a system determines that clustered data from a data set has been processed. The processing can include the grouping of information into clusters based on one or more similarities. In one embodiment, the data set is output as clusters. The clustered data then proceeds into an auto-labeling model for added detail regarding the data in the cluster. In addition to the clusters from the clustering model, input into the auto-labeling model can also be all features used by the clustering model as well as any new features missed and/or new. For example, in some instances the data set may be noisy or the model encounter noise such that a feature is missed. Additionally or alternatively, new features may be introduced as a result of new data (e.g., new fraud detection trends, new features that identify a trend/cluster, etc.

Before the features may be used, process 500 first continues to operation 504 where the features received (new and/or existing) are transformed for use with the auto-labeling model. Because the auto-labeling algorithm is designed to work with categorical features, any features which are numerical need to be transformed to a readable state. That is to say, numeric features may be transformed to a percentile over an entire population. The feature with the resulting largest percentile may be considered and denoted by a maximum bin name and while the feature that results in with the smallest percentile value may be associated with a minimum bin (e.g., max_pct1_value and min_pct1_value). This binning and name process may continue for other features available such that the features are now represented by a textual description. Additionally, or alternatively the feature numerical values may be transformed and determined based on a percentage value on a distribution. Thus, the objective becomes taking any new and/or old features which may be numerical representations and transforming them into human or machine-readable or textual values.

Once all features have been transformed, the process 500 continues to operation 506 where features are counted, and corresponding dictionaries of the features are created. At this operation, the goal is to determine how often or at what frequency features appear within a cluster. Thus, for each cluster, a dictionary is created with a feature frequency count and additionally for each feature a feature frequency count and dictionary is also included. Therefore, per cluster and per feature, a count frequency is determined for each value. This frequency count and dictionary can then be used to determine a corresponding ratio and coverage of such feature at operation 508 which will be used for labeling. To determine the ratio, as previously indicated, first on a per cluster basis, the data is split into frequency dictionaries per cluster and compared to the sum frequencies for the frequency dictionaries of the other clusters. In other words, each cluster is isolated and compared to the sum of the rest of the clusters to obtain a ratio. In one embodiment, the ratio is represented as a percentage and thus the ratio may be computed as a (value frequency within the cluster in %)/value frequency within the rest of the clusters combined in %). Next, the frequency count may also be used to determine a coverage of the feature in the clusters. The coverage may be used to provide insight on how many samples within the cluster the specific value covers. To determine the coverage, as indicated, can be computed as a ratio of the cluster frequency to the rest of the population frequency. Determining the coverage and ratio is useful in analyzing and eliminating those features with low or whose coverage is poor.

At operation 510, such determination is made which generally can consist of checking the ratio and coverage values obtained to see if a threshold criteria is met. For example, if the ratio >10 and cluster frequency >10%? If the determination is made that the values fail to meet the criteria, then process 500 may continue to operation 512, where those features are filtered out or removed from consideration or used during the labeling process. This operation is useful for providing labels with those features which are most relevant in describing the cluster. If the criteria is met, then the determination is made to keep the feature and thus process 500 continues to operation 514 where a check takes place to see if any clusters are pending whose ratio and coverage was not determined and/or whose features are checked for relevance.

Process 500 then concludes at operation 516 where those most relevant (e.g., features that meet ratio and coverage criteria) are keep and used to provide the labels that best describe the clustered data sets output from the clustering models. Such features may then be output with corresponding ratios and coverage for each cluster as described above and in conjunction with FIG. 4.

Note, that the description and ordering of the operations in process 500 are defined and illustrated for exemplary purposes. Other ordering and one or more operations may be added and/or removed. For example, feature frequency count may include a comparison against a threshold criteria such that those features which fall below the threshold are not considered and not added to the dictionary. As another example, the ratio and coverage may be determined collectively for all clusters instead of on a per cluster operation. Other examples may be contemplated and the order and number of operations at process 500 are used for exemplary purposes and one or more of the operations may varying order and process 500 is presented herein for exemplary purposes. Further, the auto-labeling results may be presented to a user on a mobile device, smart phone, laptop, desktop, or other device available to present the recommendation. Details on such device are described below and in conjunction with FIG. 7.

Figure 6:
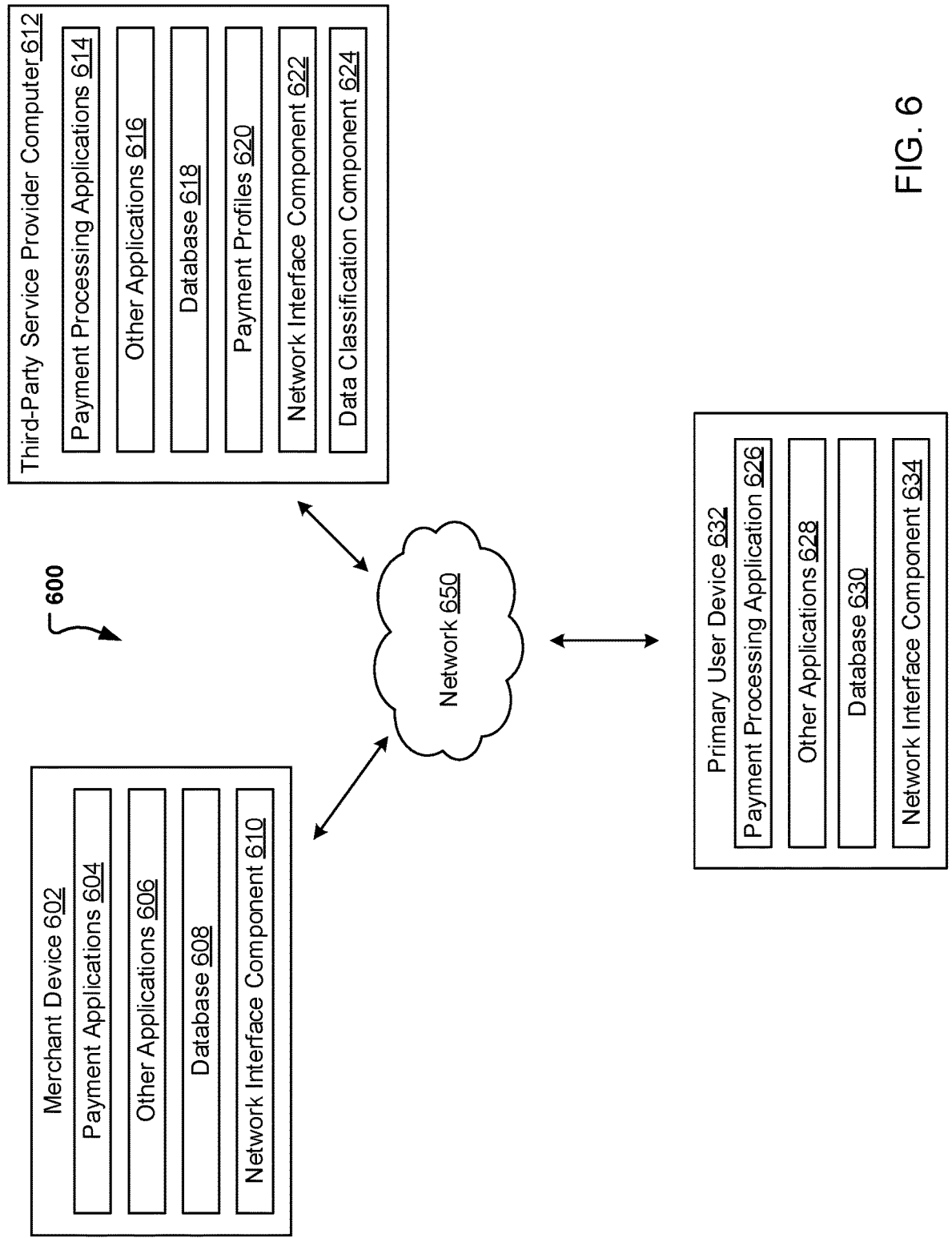
FIG. 6 illustrates a block diagram of a system for automatic cluster labeling.

FIG. 6 is a block diagram of a networked system 600 for implementing the processes described herein, according to an embodiment. In particular, FIG. 6 illustrates a block diagram of a system 600 and communication that may occur in auto-labeling clusters created by unsupervised learning methods. As shown, system 600 may include or implement a plurality of devices, computers, servers, and/or software components that operate to perform various methodologies in accordance with the described embodiments. It will be appreciated that the devices, computers, and/or servers illustrated in FIG. 6 may be deployed differently and that the operations performed, and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 600 includes a merchant or other third-party device 602, a primary user device 632, a third-party service provider computer 612 in communication over a network 650. These devices 602, 632, and 612 are exemplary devices that may interact during a transaction and in communication with a website for performing a transaction and used in conjunction with the multistage indexing method/process presented and described above and in conjunction with FIG. 5.

The merchant device 602, primary user device 632, and the third-party service provider computer 612 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 600, and/or accessible over network 650.

The merchant device 602 may be implemented as a communication device that may utilize appropriate hardware and software configured for wired and/or wireless communication with the primary user device 632 and third-party service provider computer 612. For example, the merchant device 602 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 602 may correspond to and be utilized by a user, such as an employee of a merchant and/or another person authorized by the merchant, or independently as a stand-alone system.

The merchant device 602 may include one or more payment applications 604, other applications 606, a database 608, and a network interface component 610. The payment applications 604 and other applications 606 may correspond to executable processes, procedures, and/or applications with associated hardware. In other embodiments, merchant device 602 may include additional or different components having specialized hardware and/or software to perform operations associated with the payment applications 604 and/or the other applications 606.

The payment application 604 may facilitate financial transactions corresponding to the sale of goods and/or services offered by the merchant. For example, the payment application 604 may provide an interface for customers to purchase the goods or services, make a contribution, and to receive customer payment information (e.g., customer credit card information). The payment application 604 may further transmit customer payment information to a payment processor (e.g., such as a payment processor corresponding to the third-party service provider computer 612) to process the customer payment information. The payment application 604 may also facilitate other types of financial transactions such as banking, online payments, money transfer, donations, and/or the like.

The merchant device 602 may execute the other applications 606 to perform various other tasks and/or operations corresponding to the merchant device 602. For example, the other applications 606 may include security applications for implementing client-side security features, programmatic client applications for interfacing with appropriate application programming interfaces (APIs) over network 650, or other types of applications. In various embodiments, the other applications 606 may include social networking applications. Additionally, the other applications 606 may include device interfaces and other display modules that may receive input and/or output information. For example, the other applications 606 may include a graphical user interface (GUI) configured to provide an interface to the user.

The merchant device 602 may further include a database 608, which may be stored in a memory and/or other storage device of the merchant device 602. The database 608 may include, for example, identifiers (IDs) such as operating system registry entries, cookies associated with the payment application 604 and/or other applications 606, IDs associated with hardware of the network interface component 610, IDs used for payment/user/device authentication or identification, and/or other appropriate IDs. The database 608 may also include information corresponding to one or purchase transactions of customers who have purchased goods or services from the merchant, browsing histories of the customers, or other types of customer information. In certain embodiments, the merchant device 602 may also include information corresponding to payment tokens, such as payment tokens generated by the third-party service provider computer 612.

The merchant device 602 may also include at least one network interface component 610 configured to communicate with various other devices such as the primary user device 132, and/or the third-party service provider computer 612. In various embodiments, network interface component 610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 612 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 612 may be associated with a user of the primary device 632. As such, the third-party service provider computer 612 includes one or more payment processing applications 614, which may be configured to process payment information received from the merchant device 602 or from a selection at the primary user device 632. For example, the payment application 604 of the merchant device 602 may receive payment information from a customer to purchase a service or good offered by the merchant. Upon receipt of the payment information, the payment application 604 may transmit the payment information to the third-party service provider computer 612. The payment processing application 614 of the third-party service provider computer 612 may receive and process the payment information. As another example, the payment application 604 can present a payment code on a display of the user device associated with the merchant. The payment code can be scanned or transmitted to the merchant device 602 for payment processing. Still as another example, the payment processing application can present a successful transaction notification on the display of the user device when the application has been authorized and ready for post-processing.

The third-party service provider computer 612 may execute the other applications 616 to perform various other tasks and/or operations corresponding to the third-party service provider computer 612. For example, the other applications 616 may include security applications for implementing client-side security features, programmatic client applications for interfacing with appropriate APIs over the network 650, or other types of applications. The other applications 616 may also include additional communication applications, such as email, texting, voice, and IM applications that enable communication of emails, calls, texts, and other notifications through the network 650. In various embodiments, the other applications 616 may include location detection applications, such as a mapping, compass, and/or GPS applications, which may be used to determine a location of the third-party service provider computer 612. Additionally, the other applications 616 may include device interfaces and other display modules that may receive input and/or output information. For example, the other applications 616 may include a GUI configured to provide an interface to one or more users.

The third-party service provider computer 612 may further include a database 618, which may be stored in a memory and/or other storage device of the third-party service provider computer 612. The database 618 may include, for example, IDs such as operating system registry entries, cookies associated with the payment processing application 614 and/or other the applications 616, IDs associated with hardware of the network interface component 622, IDs used for payment/user/device authentication or identification, transaction IDs, seller IDs, and/or other appropriate IDs.

According to a particular embodiment, the third-party service provider computer 612 may include a set of payment profiles 620 corresponding to past sales transactions executed by the merchant device 102 with respect to one or more customers of the merchant. Alternatively, the third-party service provider computer 612 may include a set of merchant payment profiles corresponding to the payment sources associated to a corresponding merchant. For example, a particular payment profile from the set of payment profiles 620 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 620 may include payment information corresponding to other customers of the merchant and/or other merchants associated with the user. In addition, the third-party service provider computer 612 may store the set of payment profiles 620 according to a first file format.

The third-party service provider computer 612 may also store a set of payment tokens corresponding to the set of payment profiles 620. For example, each payment profile of the set of payment profiles 620 may be associated with a corresponding payment token from the set of payment tokens. In some embodiments, each payment profile may include a corresponding payment token from the set of payment tokens. The set of payment tokens may be particular to the third-party service provider computer 612 (e.g., computers from other service providers may be unable to use the set of payment tokens) and may enable the merchant device 602 to more securely process payment transactions with the third-party service provider computer 612. For example, in order to process a payment transaction that involves a credit card number associated with a particular payment profile, the third-party service provider computer 612 may provide the merchant device 602 with a particular payment token that is different from the credit card number. The merchant device 602 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 602.

In various embodiments, the third-party service provider computer 612 also includes at least one network interface component 622 that is configured to communicate with the merchant device 602 and/or the primary user device 632 via the network 650.

The third-party provider computer 612, may also include a data classification or labeling component 624 that may be used for cluster labeling. In one embodiment, data sets may be obtained and clustered for use in marketing, assessing, and profiling a user. The clusters are oftentimes not comprehensive and necessitate relevant information for further assessment. The data classification component 624 may be used to analyze the cluster data and features to determine relevant labels for the clusters. The labels may be determined using a computation of a frequency count, ratio, and coverage which may be computed and stored in dictionaries accessible, available or completed within the data classification component 624. The data classification component 624 may include the crawling, scanning, and similar technology used in feature extraction. Additionally, the data classification component can include the one or more models and can alternatively or additionally reside in the primary user device 632 and/or merchant device 602 for clustering or performing similar types of classification which can benefit from labeling.

The primary user device 632 may be implemented as a communication device that may utilize appropriate hardware and software configured for wired and/or wireless communication with the merchant device 602 and third-party service provider computer 612. The primary user device 632, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 632 may be mobile device communicating with wearable device (or secondary user device), merchant device 602, or directly with the third-party service provider system 612.

The primary user device 632 may include a payment processing application 626 that may be used as a digital wallet that can communicate with a merchant device 602, a secondary user device, and/or third-party service provider 612 for purchasing and transacting. The payment processing application 626, can work jointly with database 630 for retrieving bank account information, user accounts, security codes, seller identification information, tokens that may be associated with various merchant locations, charities, and other relevant entities. Similarly, the payment processing application, can also provide access the user profiles for determining which payment method, processing code, and/or recommendation or tailored information to provide.

The primary user device 632 may also include other applications 628 to perform various other tasks and/or operations corresponding to the primary user device 632. For example, the other applications 628 may facilitate communication with the merchant device 602, such as to receive an indication, from the merchant device 602, to switch payment processing services from the third-party service provider to the service provider.

The primary user device 632 may further include a database 630, which may be stored in a memory and/or other storage device of the primary user device 632. The database 630 may include, for example, identifiers (IDs) such as operating system registry entries, cookies associated with a web browser and/or the other applications 628, IDs associated with hardware of the network interface component 634, IDs used for payment/user/device authentication or identification, bank information, merchant information, user accounts, and/or other appropriate IDs.

The primary user device 632 may also include at least one network interface component 634 configured to communicate with various other devices such as the merchant device 602 and/or the third-party service provider computer 612.

Figure 7:
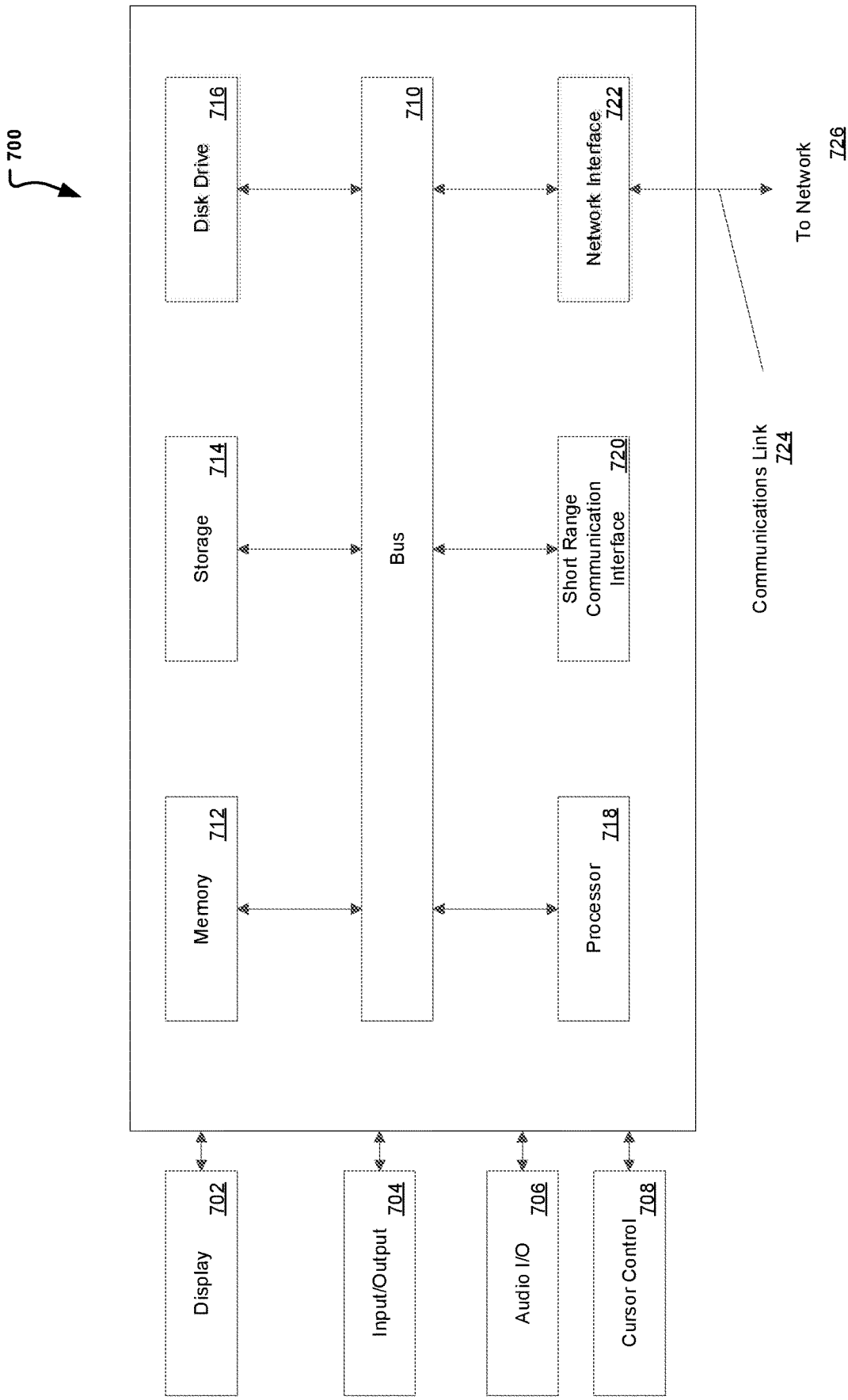
FIG. 7 illustrates an example block diagram of a computer system suitable for implementing one or more devices of the communication systems of FIGS. 1-6.

FIG. 7 illustrates an example computer system 700 in block diagram format suitable for implementing on one or more devices of the system in FIGS. 2 and 6. In various implementations, a device that includes computer system 700 may comprise a computing device (e.g., a smart or mobile device, a computing tablet, a personal computer, laptop, wearable device, PDA, server, etc.) that is capable of communicating with a network 726. A service provider and/or a content provider may utilize a network computing device (e.g., a network server or third-party service provider computer 612) capable of communicating with the network 726. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 may include an image sensor for capturing images and/or video, such as a complementary metal oxide semiconductor (CMOS) image sensor, and/or the like. An audio input/output component 706 may also be included to allow a user to use voice for inputting information by converting audio signals. Audio I/O component 706 may allow the user to hear audio. A transceiver or network interface 722 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712. Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WIFI, Bluetooth®, Bluetooth Low Energy (BLE), infrared, NFC, etc.).

Short range communications interface 720, in various embodiments, may be configured to detect other devices (e.g., primary user device 632, merchant device 602, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as Wi-Fi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing instructions;
    a processor configured to execute the instructions to cause the system to:
        determine that a clustered data set outputted by an unsupervised machine learning model is available for processing;
        retrieve clusters and features associated with the clustered data set, wherein the features were inputs to the unsupervised machine learning model;
        convert each of the features from a numerical representation to a textual representation;
        determine a feature frequency count for each feature in each cluster from the clusters and features retrieved;
        determine a ratio value and coverage value for each feature in each cluster using the feature frequency determined;
        remove the features retrieved that fail at least one of a threshold ratio or a threshold coverage criteria; and
        output cluster labels for each of the clusters retrieved, wherein the cluster labels include the features that meet the threshold ratio or the threshold coverage criteria.

2. The system of claim 1, wherein a feature frequency dictionary is created for each feature in each cluster.

3. The system of claim 2, wherein the ratio is determined using a ratio of the feature frequency dictionary of a single cluster to the sum of the feature frequency dictionaries of the rest of the clusters retrieved.

4. The system of claim 1, wherein the coverage is determined using a cluster frequency compared to a rest of a population frequency.

5. The system of claim 1, wherein the cluster labels include textual representations of features and descriptions of the features relevant to each of the clusters.

6. The system of claim 1, wherein the cluster labels are labels for the clusters retrieved and output from the unsupervised machine learning model.

7. The system of claim 1, wherein the features include at least one of a seller, a product, or risk information.

8. A method, comprising:
    determining that a clustered data set outputted by an unsupervised machine learning model is available for processing;
    retrieving clusters and features associated with the clustered data set, wherein the features were inputs to the unsupervised machine learning model;
    converting each of the features from a numerical representation to a textual representation;

determining a feature frequency count for each feature in each cluster from the clusters and features retrieved;

determining a ratio value and coverage value for each feature in each cluster using the feature frequency determined;

removing the features retrieved that fail at least one of a threshold ratio or a threshold coverage criteria; and outputting cluster labels for each of the clusters retrieved, wherein the cluster labels include the features that meet the threshold ratio or the threshold coverage criteria.

9. The method of claim 8, wherein a feature frequency dictionary is created for each feature in each cluster.

10. The method of claim 9, wherein the ratio is determined using a ratio of the feature frequency dictionary of a single cluster to the sum of the feature frequency dictionaries of the rest of the clusters retrieved.

11. The method of claim 8, wherein the coverage is determined using a cluster frequency compared to a rest of a population frequency.

12. The method of claim 8, wherein the cluster labels include numerical representations of features and descriptions of the features relevant to each of the clusters.

13. The method of claim 8, wherein the cluster labels are labels for the clusters retrieved and output from the unsupervised machine learning model.

14. The method of claim 8, wherein the features include at least one of a seller, a product, or risk information.

15. A non-transitory machine-readable medium having instructions stored thereon, the instructions executable to cause performance of operations comprising:

determining that a clustered data set outputted by an unsupervised machine learning model is available for processing;

retrieving clusters and features associated with the clustered data set, wherein the features were inputs to the unsupervised machine learning model;

converting each of the features from a numerical representation to a textual representation;

determining a feature frequency count for each feature in each cluster from the clusters and features retrieved;

determining a ratio value and coverage value for each feature in each cluster using the feature frequency determined;

removing the features retrieved that fail at least one of a threshold ratio or a threshold coverage criteria; and outputting cluster labels for each of the clusters retrieved, wherein the cluster labels include the features that meet the threshold ratio or the threshold coverage criteria.

16. The non-transitory machine-readable medium of claim 15, wherein a feature frequency dictionary is created for each feature in each cluster.

17. The non-transitory machine-readable medium of claim 16, wherein the ratio is determined using a ratio of the feature frequency dictionary of a single cluster to the sum of the feature frequency dictionaries of the rest of the clusters retrieved.

18. The system of claim 1, wherein the converting each of the features from a numerical representation to a textual representation comprises converting each feature to the textual representation of percentage value of the feature amongst a population of the features.

19. The method of claim 8, wherein the converting each of the features from a numerical representation to a textual representation comprises converting each feature to the textual representation of percentage value of the feature amongst a population of the features.

20. The non-transitory machine readable medium of claim 15, wherein the converting each of the features from a numerical representation to a textual representation comprises converting each feature to the textual representation of percentage value of the feature amongst a population of the features.

* * * * *